United States Patent
Taylor (10) Patent No.: US 10,392,232 B2
(45) Date of Patent: Aug. 27, 2019

(54) PIPE LIFTER

(71) Applicant: Christopher Kent Taylor, Queensland (AU)

(72) Inventor: Christopher Kent Taylor, Queensland (AU)

(73) Assignee: Christopher Kent Taylor, Queensland (AU)

( * ) Notice: Subject to any disclaimer, the term of this patent is extended or adjusted under 35 U.S.C. 154(b) by 0 days.

(21) Appl. No.: 16/082,327

(22) PCT Filed: Mar. 9, 2017

(86) PCT No.: PCT/AU2017/050213
§ 371 (c)(1),
(2) Date: Sep. 5, 2018

(87) PCT Pub. No.: WO2017/152235
PCT Pub. Date: Sep. 14, 2017

(65) Prior Publication Data
US 2019/0010027 A1    Jan. 10, 2019

(30) Foreign Application Priority Data

Mar. 10, 2016   (AU) ................................ 2016900894

(51) Int. Cl.
| | | |
|---|---|---|
| *B66C 1/62* | (2006.01) | |
| *B66C 1/68* | (2006.01) | |
| *F16L 1/032* | (2006.01) | |

(52) U.S. Cl.
CPC .................. *B66C 1/62* (2013.01); *B66C 1/68* (2013.01); *F16L 1/032* (2013.01)

(58) Field of Classification Search
CPC ................ B66C 1/62; B66C 1/68; B66C 1/12
(Continued)

(56) References Cited

U.S. PATENT DOCUMENTS

| | | | | |
|---|---|---|---|---|
| 1,834,499 A | * | 12/1931 | Richter | ..................... B66C 1/22 |
| | | | | 294/192 |
| 2,789,716 A | | 4/1957 | Wolf | |

(Continued)

FOREIGN PATENT DOCUMENTS

| | | |
|---|---|---|
| AU | 2010202113 | 12/2010 |
| DE | 10112111 A1 | 10/2002 |

(Continued)

OTHER PUBLICATIONS

International Search Report and Written Opinion for International Application No. PCT/AU2017/050213 dated Apr. 18, 2017.

(Continued)

*Primary Examiner* — Paul T Chin
(74) *Attorney, Agent, or Firm* — Wegman Hessler (57) ABSTRACT

A pipe lifter for carrying one or more pipes including a slidably extendable elongate member and two sets of two laterally extending arms on each side of the elongate member. Each set of the two laterally extending arms are opposed to each other. Each of the laterally extending arms is pivotally fixed to the elongate member and moveable between a folded position where the arm is adjacent and parallel with the elongate member and an operational position where the arm extends laterally substantially at ninety degrees with respect to the elongate member. There are two or more L-shaped support members attachable to the laterally extending arms. There is also a hydraulic or pneumatic ram operationally configured to extend and shorten the length of the elongate member. In use, the L-shaped support members attached to the opposing laterally extending arms are positioned to be substantially opposing each other and the length of the elongate member is adjusted so that the outwardly extending section of the L-shaped support pipe is (Continued)

locatable within each open end of the pipe to secure the pipe to the pipe lifter.

10 Claims, 8 Drawing Sheets

(58) Field of Classification Search
USPC ............... 294/119.1, 74, 81.21, 81.54, 82.19
See application file for complete search history.

(56) References Cited

U.S. PATENT DOCUMENTS

| | | | | |
|---|---|---|---|---|
| 3,561,615 | A * | 2/1971 | Forsberg | F16L 1/09 |
| | | | | 29/237 |
| 4,029,217 | A | 6/1977 | Morse | |
| 4,563,031 | A * | 1/1986 | Kishimoto | B66C 1/62 |
| | | | | 294/81.21 |
| 4,736,971 | A * | 4/1988 | McManus | B66C 1/427 |
| | | | | 294/119.1 |
| 6,145,903 | A * | 11/2000 | Stinis | B66C 1/102 |
| | | | | 294/81.1 |
| 7,503,606 | B2 * | 3/2009 | Hall | B66C 1/28 |
| | | | | 294/81.52 |
| 8,146,971 | B2 * | 4/2012 | LaValley | E21B 19/14 |
| | | | | 294/81.61 |
| 2013/0047908 | A1 * | 2/2013 | Baten | B63B 27/10 |
| | | | | 114/268 |
| 2014/0028038 | A1 * | 1/2014 | LaValley | B66C 1/44 |
| | | | | 294/81.61 |

FOREIGN PATENT DOCUMENTS

| | | |
|---|---|---|
| EP | 0141518 | 5/1985 |
| JP | S 4710271 U | 10/1972 |
| JP | S 624188 A | 1/1987 |
| SU | 1463690 | 3/1989 |

OTHER PUBLICATIONS

Second Written Opinion for International Application No. PCT/AU2017/050213 dated Feb. 27, 2018.
International Preliminary Report on Patentability for International Application No. PCT/AU2017/050213 dated Jul. 3, 2018.
European Search Report issued in European Patent Application No. 17762339.4, dated Mar. 7, 2019, 7 pages.

* cited by examiner

PIPE LIFTER

CROSS REFERENCE TO RELATED APPLICATION

This application is a national phase of International Patent Application No. PCT/AU2017/050213 filed Mar. 9, 2017, and which claims the priority filing benefit of Australian Patent Application No. 2016900894 filed Mar. 10, 2016, both of which are incorporated herein by reference in their entirety.

FIELD OF INVENTION

The present invention relates to apparatus for the lifting of pipes, tubes, casings and similar items. The present invention has particular but not exclusive application for use in lifting multiple concrete pipes. Reference in the specification to concrete pipes is by way of example only and the invention is not limited to concrete pipes.

BACKGROUND OF THE INVENTION

Concrete pipes are lifted to and from trucks and into an in-use position by the use of hooks, clamps and harnesses. The hooks, clamps and harnesses are attached to a crane, forklift or excavator. Harnesses are often one or more chain slings that are positioned around a concrete pipe and supported by a hydraulic arm of the excavator or crane. Hooks are specifically shaped metal plates that can attach to the ends of open pipes and are lifted with the use of chains attached to hydraulic arms. Lifting clamps are usually scissor type clamps that use a jaw and pivot arrangement to clamp about the circumference of the pipe or form a vice-type grip that clamps to the inside and outside of the pipe wall at one end.

Examples of pipe lifting clamps include the pipe lifting apparatus described in U.S. Pat. No. 6,568,731 which uses gripping arms with scissor-type linkages to clamp about the outside of the pipe. U.S. Pat. No. 7,950,709 describes a lifting clamp that has two opposed arms that clamp to opposite sides of the pipe. Each of the described lifting clamps are attachable to actuating or hoisting apparatus The aforementioned lifting apparatus are designed and made to lift and manipulate one pipe at a time. The disadvantage to this arrangement is that multiple pipes need to be moved in some situations and the use of lifting apparatus that can only move one pipe at a time is inefficient and time consuming.

OBJECT OF THE INVENTION

It is an object of the present invention to overcome at least in part the abovementioned disadvantage and provide a pipe lifter that can carry a plurality of pipes at one time.

SUMMARY OF THE INVENTION

In one aspect the present invention broadly resides in a pipe lifter for carrying one or more pipes including
an extendable elongate member;
two spaced apart transverse means fixed to the extendable elongate member;
two or more support members attachable to each of the two transverse means, each of said support members is shaped to be positionable within an end of the one or more pipes; and
lengthening means to change the length of the extendable elongate member, wherein in use the support members attached to the two transverse means are positioned to be substantially opposing each other and the lengthening means actuated to adjust the length of the elongate member so that the pipe is secured with the support members in each end of the pipe.

Preferably the elongate member is slidably extendable.

The elongate member can preferably be extended from one or both ends.

Preferably the lengthening means includes a hydraulic or pneumatic ram that can extend and shorten the length of the elongate member.

Preferably the two spaced apart transverse means includes two sets of two laterally extending arms on each side of the elongate member fixed at each end of the elongate member and when in use the sets of the laterally extending arms are substantially parallel with each other. Each laterally extending arm is pivotally fixed to the elongate member moveable between a folded position where the arm is adjacent and parallel with the elongate member and an operational position where the arm extends laterally substantially at ninety degrees with respect to the elongate member.

Alternatively, the two spaced apart transverse means includes a transverse member fixed at each end of the elongate member and substantially parallel with each other.

In a further aspect, the invention resides in a pipe lifter for carrying one or more pipes including
an extendable elongate member;
two sets of two laterally extending arms on each side of the elongate member, each set of two laterally extending arms are opposed to each other, each of the laterally extending arms is pivotally fixed to the elongate member and moveable between a folded position where the arm is adjacent and parallel with the elongate member and an operational position where the arm extends laterally substantially at ninety degrees with respect to the elongate member;
two or more support members attachable to the laterally extending arms, each of said support members is shaped to be positionable within an end of the one or more pipes; and
a hydraulic or pneumatic ram operationally configured to extend and shorten the length of the elongate member, wherein in use the support members attached to opposing laterally extending arms are positioned to be substantially opposing each other and the length of the elongate member is adjusted so that the pipe is secured with the support members in each end of the pipe.

Each of the laterally extending arms has a series of recesses or slots along the edge that faces the opposing laterally extending arm. The series of recesses or slots preferably assist to locate the support member in a position that is substantially opposed to a support member on the opposing laterally extending arm.

Preferably the support members can be added or removed as needed so that a single pipe lifter can carry one, two or more pipes at any one time. The support members are preferably spaced apart on the laterally extending arms in positions that accommodates pipes of different diameters. When not in use, the support members can preferably be removed or arranged upside down so as not to interfere with the pipe.

The support member is preferably L-shaped and the outwardly extending section of the support member is positionable within the end opening of the pipe.

In a further aspect, the invention resides in a pipe lifter for carrying one or more pipes including an extendable elongate member;

two opposing transverse members fixed to the elongate member;

two or more support members attachable to the transverse members, each of said support members is shaped to be positionable within an end of the one or more pipes; and a hydraulic or pneumatic ram operationally configured to extend and shorten the length of the elongate member, wherein in use the support members attached to the transverse members are positioned to be substantially opposing each other and the length of the elongate member is adjusted so that the pipe is secured with the support members in each end of the pipe.

In another embodiment, the invention resides in a pipe lifter for carrying one or more pipes including an elongate member;

two opposing transverse members, said members are moveable along the elongate member and fixable in position at a desired spacing from each other;

two or more support members attachable to the transverse members, each of said support members is shaped to be positionable within an end of the one or more pipes; and wherein in use the support members attached to the opposing transverse members are positioned to be substantially opposing each other and at the desired spacing from each other so that the pipe is secured with the support members in each end of the pipe.

In a further embodiment, the invention resides in a pipe lifter for carrying one or more pipes including an elongate member;

two sets of two laterally extending arms on each side of the elongate member, each set of two laterally extending arms are opposed to each other, said arms are moveable along the elongate member and fixable in position at a desired spacing from each other, said arms are moveable between a folded position where the arm is adjacent and parallel with the elongate member and an operational position where the arm extends laterally substantially at ninety degrees with respect to the elongate member;

two or more support members attachable to the laterally extending arms, each of said support members is shaped to be positionable within an end of the one or more pipes; and wherein in use the support members attached to the opposing laterally extending arms are positioned to be substantially opposing each other and at the desired spacing from each other so that the pipe is secured with the support members in each end of the pipe.

In a further embodiment, the invention is in a pipe lifter for carrying one or more pipes including an elongate member;

two opposing transverse members or two sets of two laterally extending arms on each side of the elongate member that are fixed or fixable at the ends or adjacent the ends of the elongate member and at a desired spacing from each other;

two or more support members attachable to the opposing transverse members or laterally extending arms, each of said support members is shaped to be positionable within an end of the one or more pipes; and wherein in use the support members attached to the opposing transverse members or opposing laterally extending arms are positioned to be substantially opposing each other and at the desired spacing from each other so that the pipe is secured with the support members in each end of the pipe.

In a another aspect, the invention resides in a pipe lifter for carrying one or more pipes including an extendable elongate member;

two laterally extending arms on each side of the elongate member and at each end of the elongate member, each of the laterally extending arms is pivotally fixed to the elongate member and moveable between a folded position where the arm is adjacent and parallel with the elongate member and an operational position where the arm extends laterally substantially at ninety degrees with respect to the elongate member;

two or more L-shaped support members attachable to the laterally extending arms, an outwardly extending section of the L-shaped support member is positionable within the end opening of the pipe; and a hydraulic or pneumatic ram operationally configured to extend and shorten the length of the elongate member, wherein in use the L-shaped support members attached to opposing laterally extending arms are positioned to be substantially opposing each other and the length of the elongate member is adjusted so that the outwardly extending section of the L-shaped support pipe is located within each open end of the pipe to secure the pipe to the pipe lifter.

The pipe lifter in one form can preferably carry two or more pipes.

The pipe lifter in another form can preferably carry two or more pipes of different diameters.

The features described with respect to one aspect also apply where applicable to all other aspects of the invention. Furthermore different combinations of described features are herein described and claimed even when not expressly stated.

BRIEF DESCRIPTION OF THE DRAWINGS

In order that the present invention can be more readily understood reference will now be made to the accompanying drawings which illustrate a preferred embodiment of the invention and wherein.

DETAILED DESCRIPTION OF THE PREFERRED EMBODIMENT

With reference to the FIGS. 1 to 9, there is shown a preferred embodiment of the pipe lifter 10. The pipe lifter 10 included a slideable elongate member 11 with laterally extending arms 12 pivotally attached to each end of the elongate member 11. The elongate member 11 comprises three parts where there is an outer sleeve 13 and two inner sleeves 14. The inner sleeves 14 are slideably retained within the outer sleeve 13. Each free end of the inner sleeve 14 is attached to the pivotally attached lateral arms 12. The lateral arms 12 are attached to a connecting plate 17 which is fixed to the free end of the inner sleeves 14. A hydraulic ram 20 is connected to the connecting plate 17 and the outer sleeve 13. When the hydraulic ram 20 is actuated it pushes the connecting plate 17 away from the outer sleeve 13 or draws the connecting plate 17 towards the outer sleeve 13. As there are two hydraulic rams 20 operationally associated with the inner sleeves 14 at each end of the elongate member 11, the actuation of the hydraulic ram 20 controls the movement of both inner sleeves 14 relative to the outer sleeve 13. In other embodiments there may be only one inner sleeve and only one end of the elongate member extends and contracts.

The hydraulic ram 20 includes hydraulic hoses 21 and coupling 22. Coupling 22 connects the pipe lifter 10 to the excavator or crane arm. This is shown more clearly in FIGS. 8 and 9.

Along the lateral arms 12 are L-shaped hooks 25. The L-shaped hooks 25 comprise of a leg section 26 and a foot section 27. The leg section 26 serves to attach the L-shaped hook 25 to the lateral arm 12 while the foot section 27 is positionable within the open end of a pipe in order to retain and secure the pipe to the pipe lifter 10. The L-shaped hooks 25 are fixed to the lateral extending arms 12 via a fastener 30. The lateral arm 12 has a series of slots or recesses 31 to assist in the positioning of the L-shaped hooks 25. The series of slots or recesses 31 along the lateral arms 12 face the opposing lateral arms 12 at the other end of the elongate member 11.

The L-shaped hooks 25 can be removed or repositioned along each of the lateral arms 12 providing the corresponding L-shaped hook 25 on the opposing lateral arm 12 is substantially aligned so that the pipes can be secured substantially parallel with each other and the elongate member 11.

Figure 1:
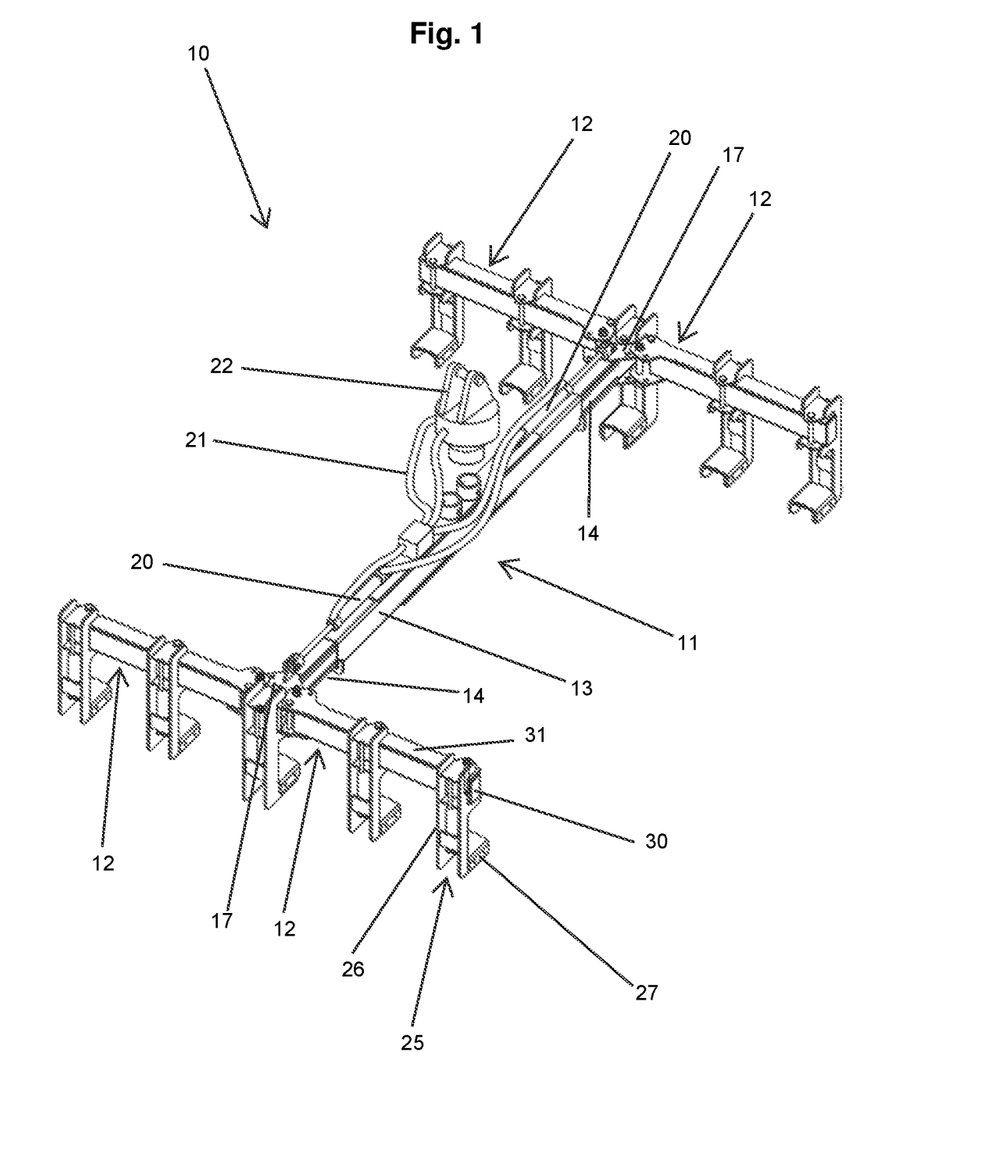
FIG. 1 is a diagrammatic view of the pipe lifter of the preferred embodiment.
Figure 2:
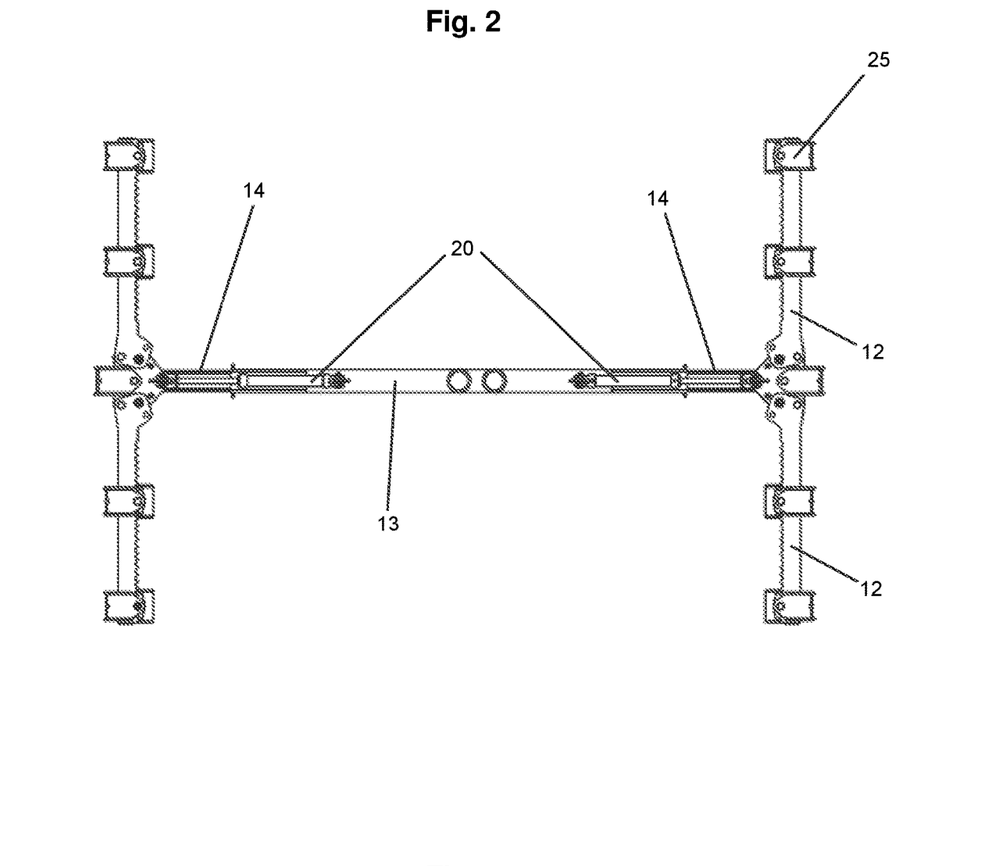
FIG. 2 is a diagrammatic top view of the pipe lifter (without hydraulic hoses and coupling)
Figure 3:
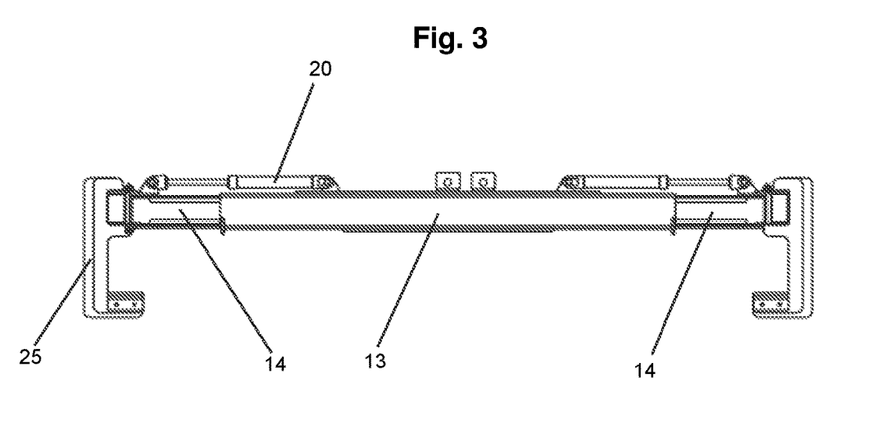
FIG. 3 is a diagrammatic side view of the pipe lifter (without hydraulic hoses and coupling)
Figure 4:
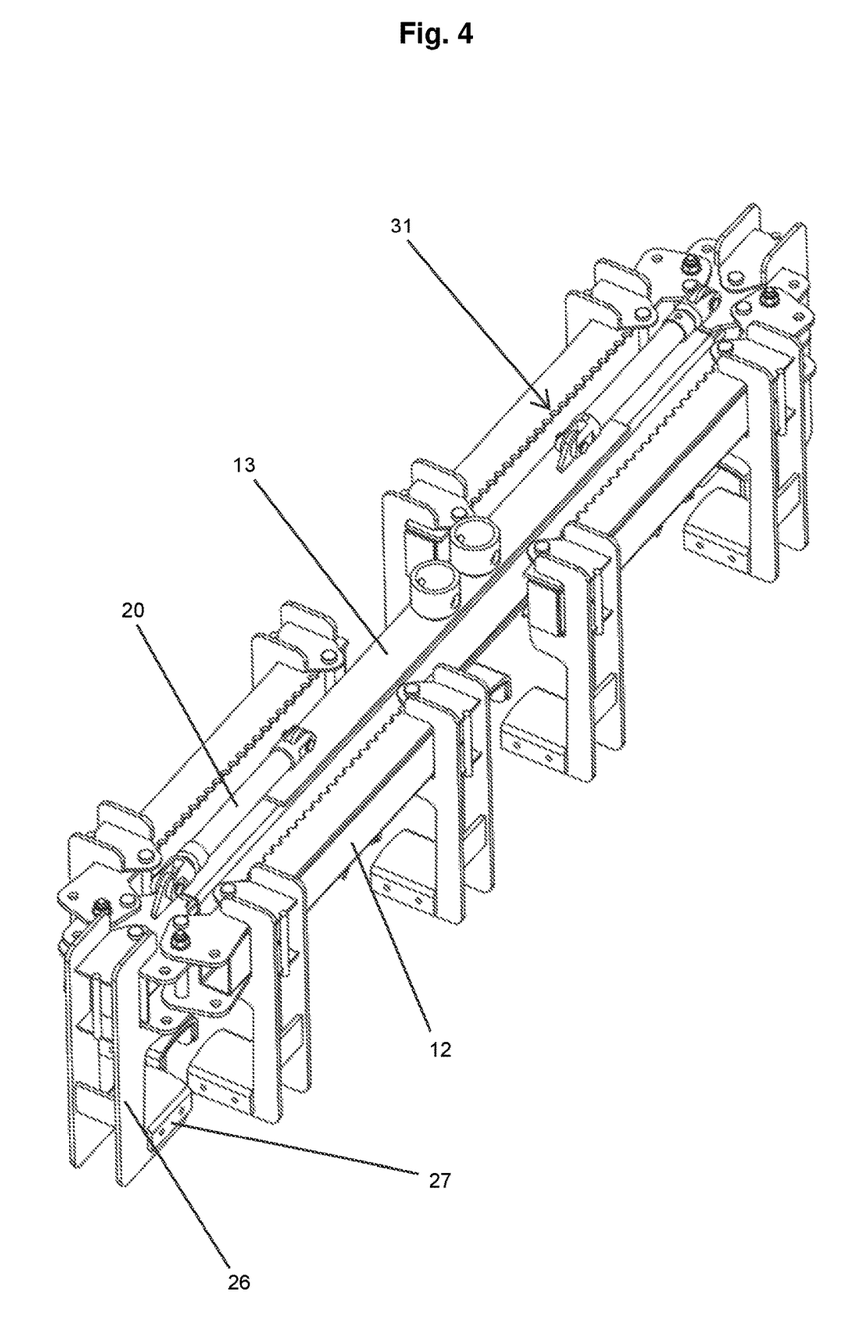
FIG. 4 is a diagrammatic view of the pipe lifter in a folded position and without hydraulic hoses and coupling.
Figure 5:
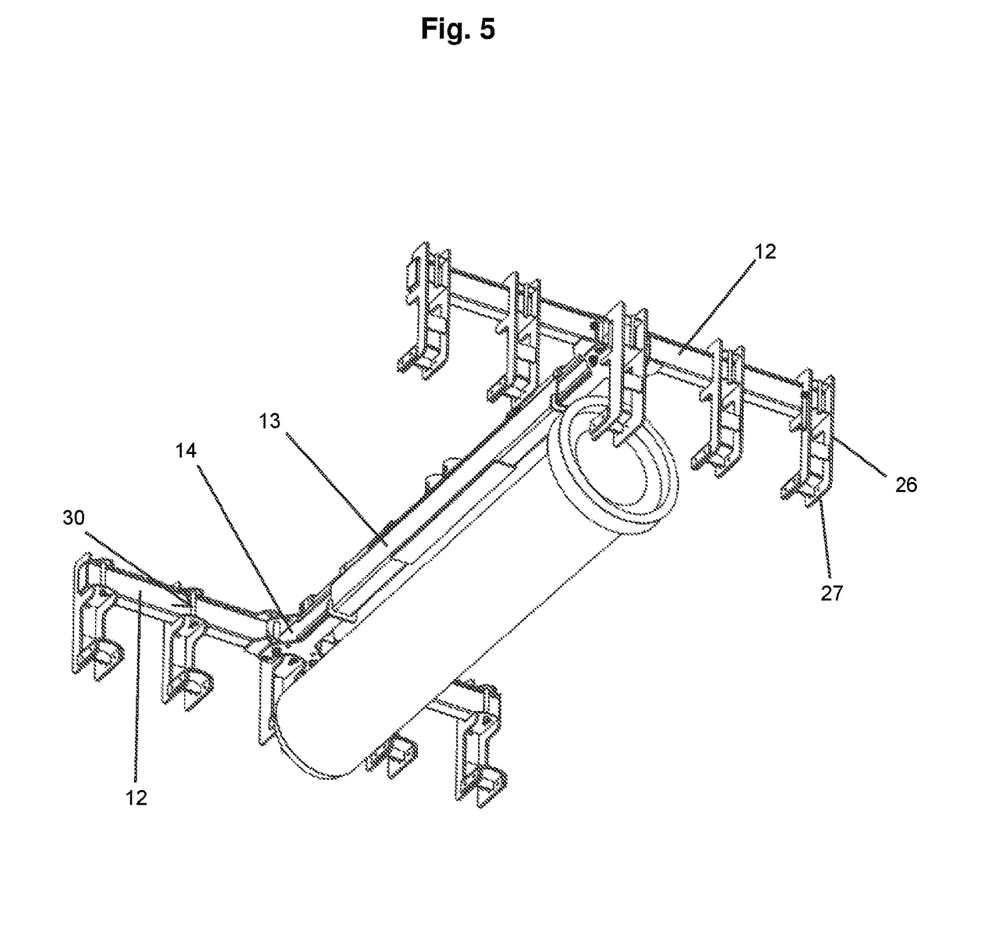
FIG. 5 is a diagrammatic view of the pipe lifter (without hydraulic hoses and coupling) and carrying a single pipe.
Figure 6:
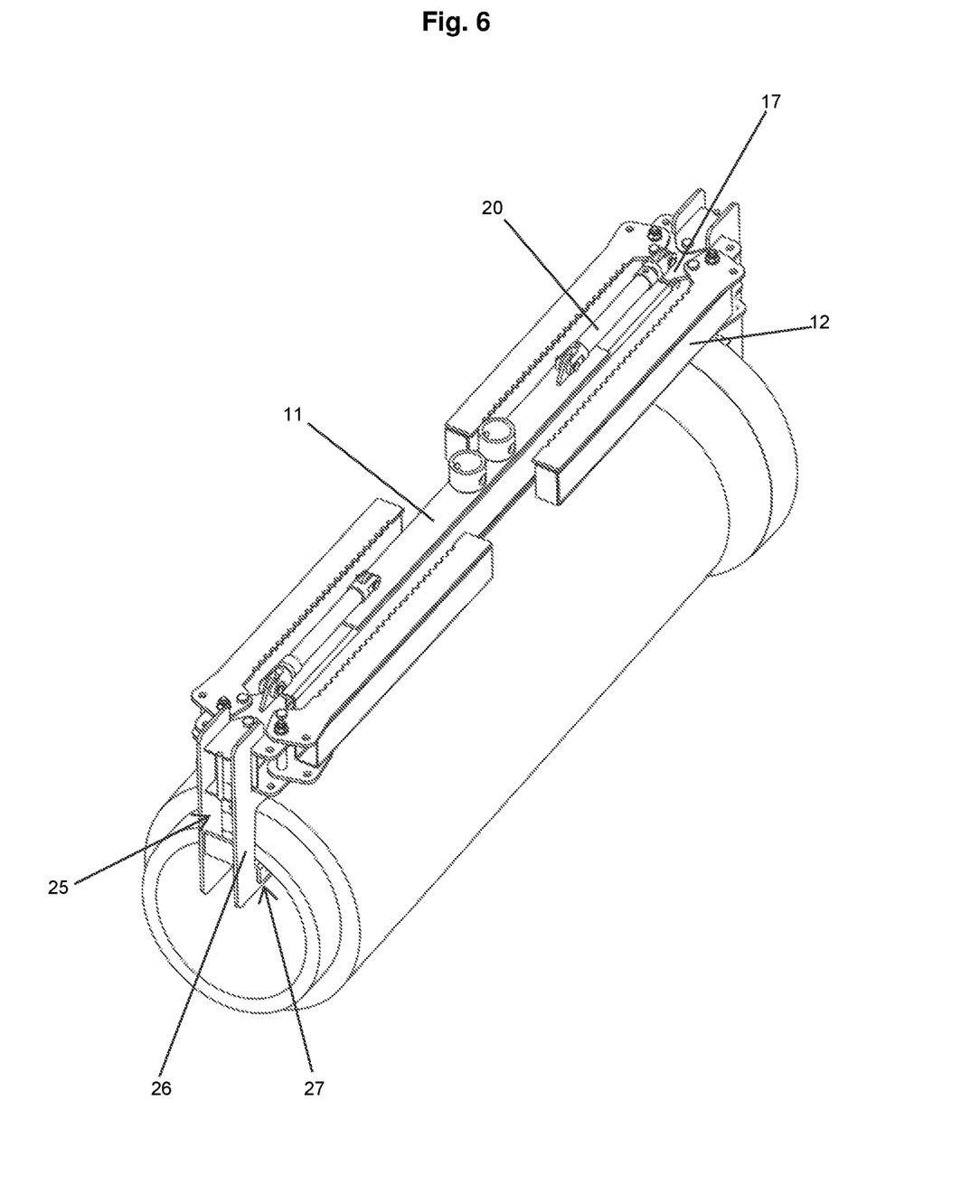
FIG. 6 is a diagrammatic view of the folded pipe lifter (without hydraulic hoses and mounting) and carrying a pipe.
Figure 7:
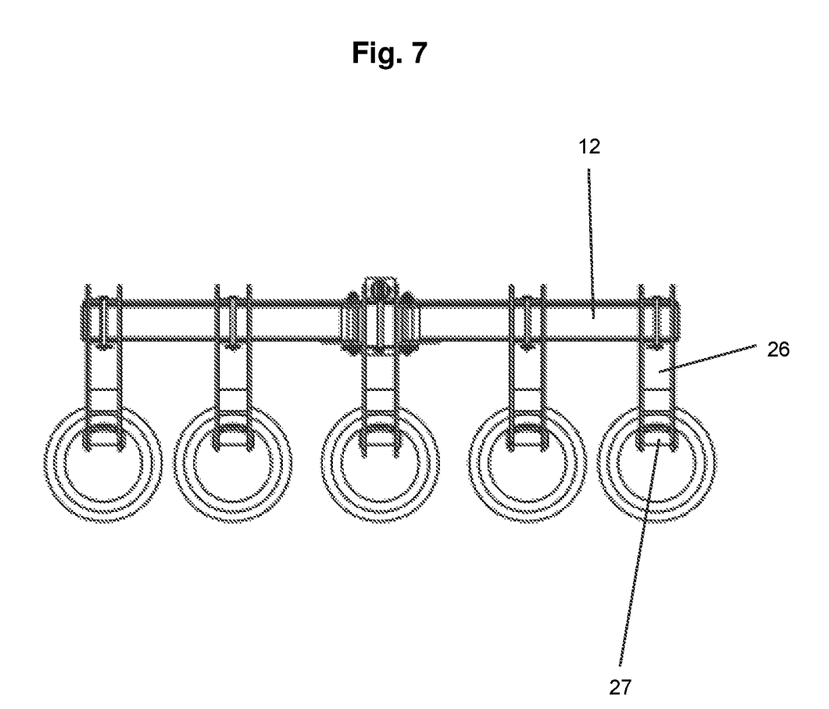
FIG. 7 is an end view of the pipe lifter (without hydraulic hoses and mounting) where the pipe lifter is carrying five pipes.
Figure 8:
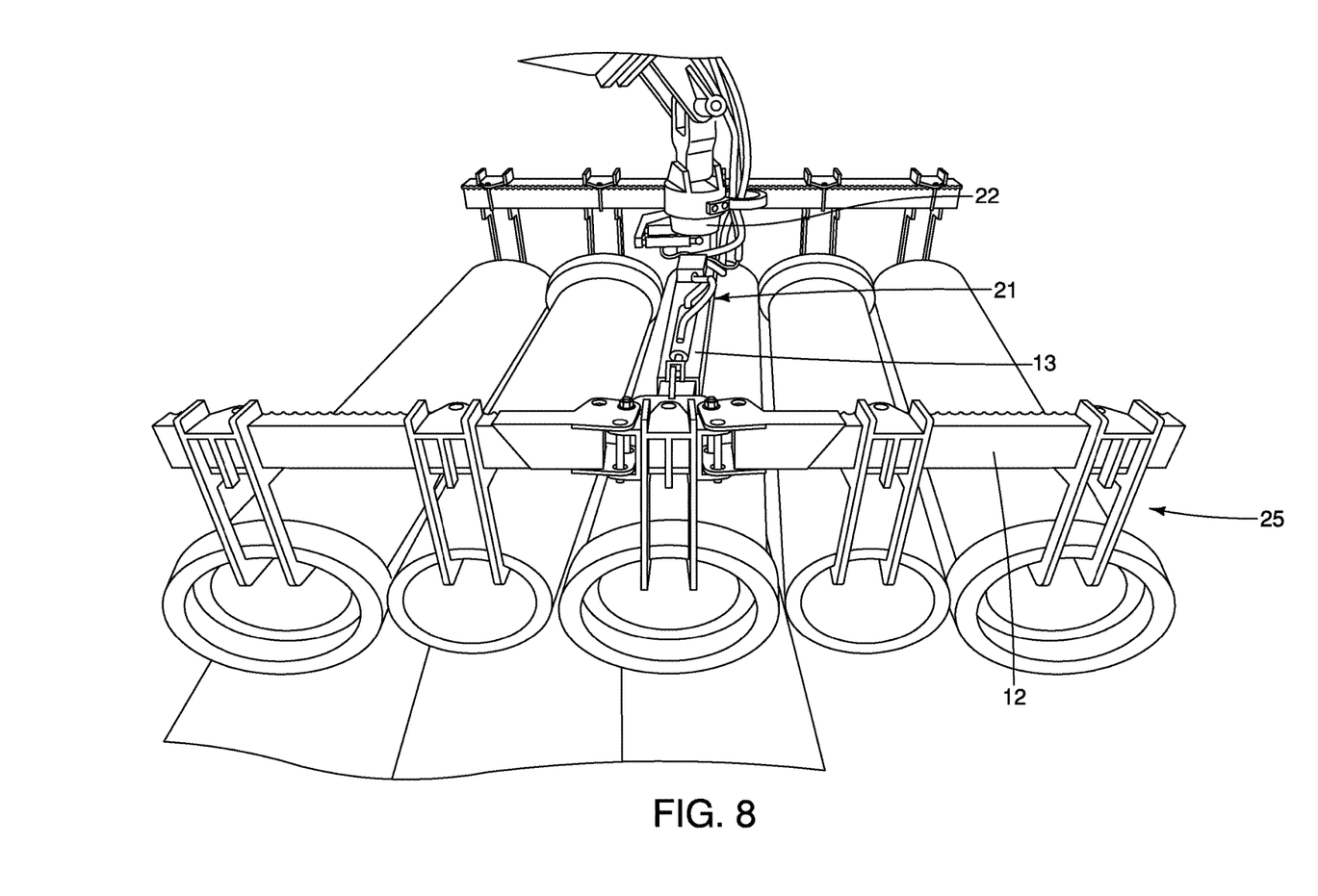
FIG. 8 is a photograph of the pipe lifter carrying five pipes.
Figure 9:
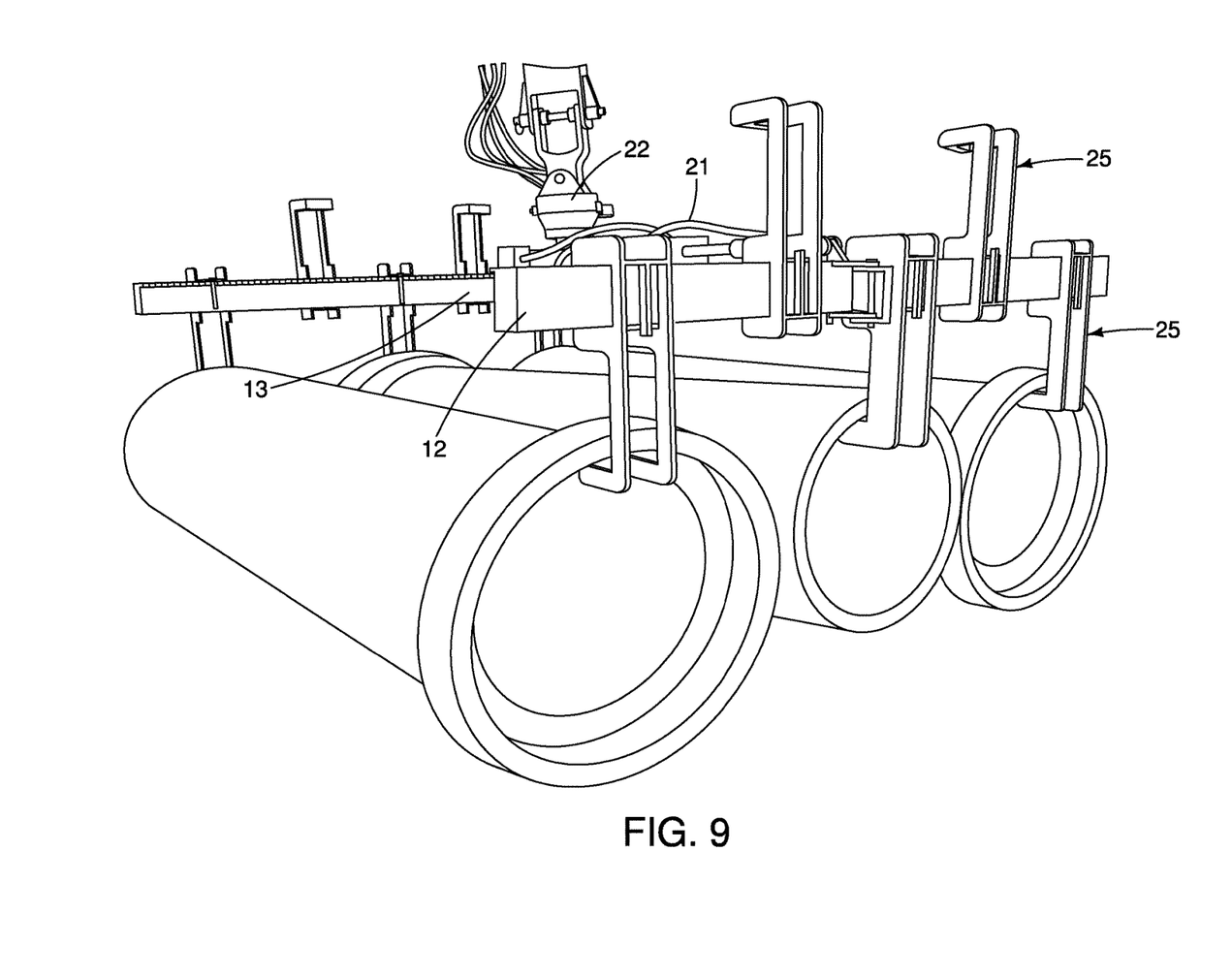
FIG. 9 is a photograph of the pipe lifter carrying three pipes.

FIG. 1 shows five L-shaped hooks 25 at each end and they are in alignment with the corresponding L-shaped hooks 25 on the opposing lateral arms 12. In contrast, FIGS. 6 and 9 show one and three L-shaped hooks 25 on each end respectively. The L-shaped hooks 25 can be removed when not needed or when larger diameter pipes are being carried and thus require more space. With reference to FIG. 9 there is shown three L-shaped hooks 25 in opposing positions and two other L-shaped hooks 25 rearranged in an upside down position to remove them from interfering with the pipes being carried.

With the preferred embodiment, pipes with a diameter of 600 mm or larger can be carried singly, in pairs or in threes by the pipe lifter 10. Where the pipes have a diameter of 450 mm, up to four pipes can be carried by the pipe lifter 10. Where the pipes have a diameter of 300 mm, then up to five pipes can be carried at a single time by the pipe lifter 10. Where the pipes have a very large diameter of up to 1800 mm, such as shown in FIG. 6, the lateral arms 12 are in a folded position to avoid interfering with the large pipe.

In use, a number of L-shaped hooks 25 will be mounted and fixed in position along the lateral arms 12 depending on the diameter size of the pipes being moved. The pipe lifter 10 is then positioned over the pipes to be carried and the L-shaped hooks 25 are adjusted so that the foot section 27 of each L-shaped hook 25 is located within the opening of each pipe and the pipe end periphery is adjacent or abuts the L-shaped hook 25. In this way the pipe is captured and retained at each end by the L-shaped hook 25 and there is no longitudinal movement of the pipe thereby preventing it from falling from the secured position. When all the pipes are secured to the pipe lifter 10, the pipe lifter 10 is then maneuvered by the excavator or crane arm to a desired position and the pipes are released when the hydraulic rams 20 extend the inner sleeves 14 so that the foot section 27 of each of the L-shaped hooks 25 withdraws from within the pipe end.

ADVANTAGES

The advantages of the preferred embodiment of the present invention include the ability to move a plurality of pipes at any one time. Furthermore the pipe lifter can lift and carry pipes of different diameters or a mixture of pipes with different diameters in any one load.

The number of pipes and the size of pipes (both in diameter and in length) can be adjusted per load using the preferred embodiment of the pipe lifter.

The pipe lifter of the preferred embodiment is easy to use and relatively quick to set up without placing any unnecessary force on the pipe itself.

The pipe lifter of the preferred embodiment also provides the advantage that it complies with the health and safety requirements for the loading, unloading and moving of pipes from one location to another.

Without the preferred embodiment of the pipe lifter, a person must continually climb up and jump down from the back of the truck to attach and unhook the load of pipes. With the repetitive movement, a person can fall and cause themselves an injury. With the preferred embodiment of the pipe lifter, there is no need for a person to repetitively climb up and jump down from the back of the truck thereby avoiding the risk of injury.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A pipe lifter for carrying one or more pipes including an extendable elongate member;
    two sets of two laterally extending arms on each side of the elongate member, each of the laterally extending arms is pivotally fixed to the elongate member and moveable between a folded position where the arm is adjacent and parallel with the elongate member and an operational position where the arm extends laterally substantially at ninety degrees with respect to the elongate member;
    two or more support members attachable to the laterally extending arms, each of said support members is shaped to be positionable within an end of the one or more pipes; and
    a hydraulic or pneumatic ram operationally configured to extend and shorten the length of the elongate member, wherein in use the support members attached to opposing laterally extending arms are positioned to be substantially opposing each other and the length of the elongate member is adjusted so that the pipe is secured with the support members in each end of the pipe.

2. The pipe lifter as claimed in claim 1, wherein each of the laterally extending arms has a series of recesses or slots along the edge that faces the opposing laterally extending arm to locate the support member in a position that is substantially opposed to a support member on the opposing laterally extending arm.

3. The pipe lifter as claimed in claim 1, wherein the support members can be added or removed as needed so that a single pipe lifter can carry one, two or more pipes at any one time.

4. The pipe lifter as claimed in claim 1, wherein the support members are spaced apart on the laterally extending arms in positions that accommodates pipes of different diameters.

5. The pipe lifter as claimed in claim 1, wherein the support members can be removed or arranged upside down so as not to interfere with the pipes when they are not in use.

6. The pipe lifter as claimed in claim 1, wherein the support member is L-shaped and the outwardly extending section of the support member is positionable within the end opening of the pipe.

7. The pipe lifter as claimed in claim 1, wherein the elongate member is slidably extendable.

8. A pipe lifter for carrying one or more pipes including a slidably extendable elongate member;
two sets of two laterally extending arms on each side of the elongate member, each set of two laterally extending arms are opposed to each other, each of the laterally extending arms is pivotally fixed to the elongate member and moveable between a folded position where the arm is adjacent and parallel with the elongate member and an operational position where the arm extends laterally substantially at ninety degrees with respect to the elongate member;
two or more L-shaped support members attachable to the laterally extending arms, an outwardly extending section of the L-shaped support member is positionable within the end opening of the pipe; and
a hydraulic or pneumatic ram operationally configured to extend and shorten the length of the elongate member, wherein in use the L-shaped support members attached to opposing laterally extending arms are positioned to be substantially opposing each other and the length of the elongate member is adjusted so that the outwardly extending section of the L-shaped support pipe is located within each open end of the pipe to secure the pipe to the pipe lifter.

9. The pipe lifter as claimed in claim 8, wherein the pipe lifter can carry two or more pipes.

10. The pipe lifter as claimed in claim 8, wherein the pipe lifter can carry two or more pipes of different diameters.

* * * * *

UNITED STATES PATENT AND TRADEMARK OFFICE
CERTIFICATE OF CORRECTION

| | | |
|---|---|---|
| PATENT NO. | : 10,392,232 B2 | Page 1 of 1 |
| APPLICATION NO. | : 16/082327 | |
| DATED | : August 27, 2019 | |
| INVENTOR(S) | : Christopher Kent Taylor | |

It is certified that error appears in the above-identified patent and that said Letters Patent is hereby corrected as shown below:

On the Title Page

Item (73) the Assignee's name is incorrectly listed as Christopher Kent Taylor.
Please correct the Assignee's name to be: Precision Pipe Lifter Pty Ltd.

Signed and Sealed this
Ninth Day of June, 2020

Andrei Iancu
*Director of the United States Patent and Trademark Office*